Nov. 15, 1938.  L. A. DANSE  2,136,675
COATING MEASURING DEVICE
Filed Feb. 17, 1937
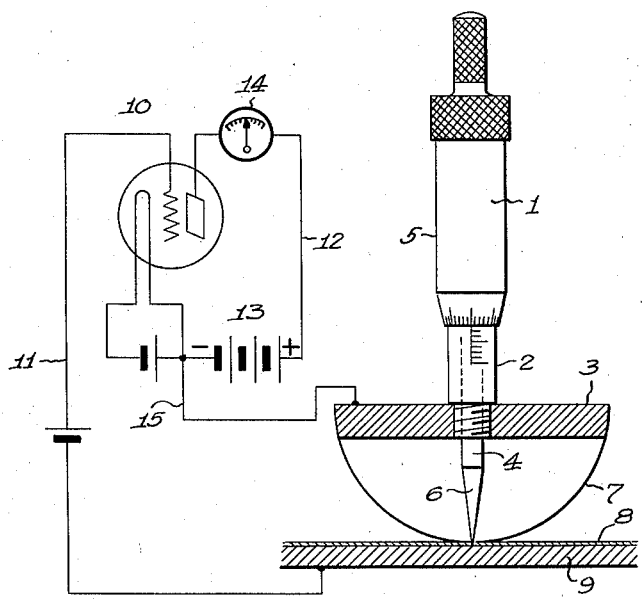
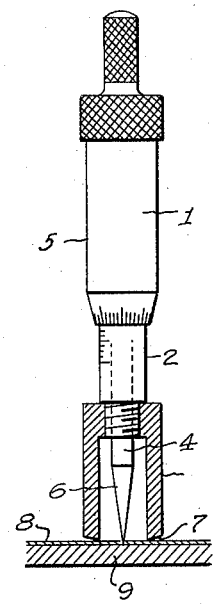
Fig.1.  Fig.2.
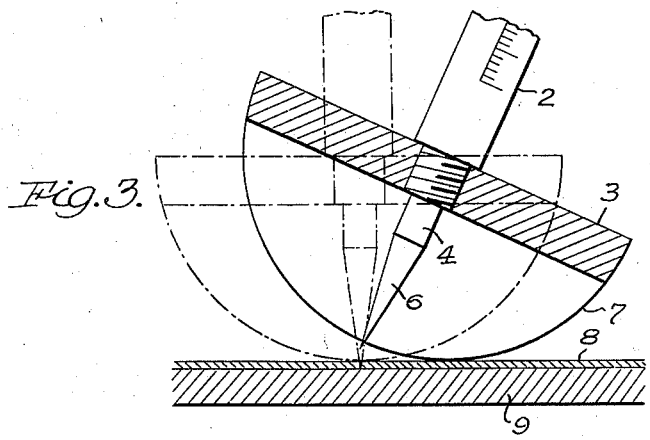
Fig.3.
Inventor
Launcelot A. Danse,
By Barthel & Barthel
Attorneys Patented Nov. 15, 1938

2,136,675

UNITED STATES PATENT OFFICE 2,136,675

COATING MEASURING DEVICE

Launcelot A. Danse, Detroit, Mich.

Application February 17, 1937, Serial No. 126,122

3 Claims. (Cl. 33—170)

This invention relates to a type of micrometer gauge which is especially adapted for determining the exact thickness of a film or coating of relatively non-conducting material covering a body of metal.

Devices for this purpose have been manufactured and some of these devices have included electrically operated indicating means for indicating the thickness of the coating by the piercing of the coating by means of a member operated by a gauge and coming into contact with the surface of the metal to which the coating is applied, the gauge and the coated metal being connected within an electrical circuit in which the indicator is connected. With such an arrangement, an electrical circuit of considerable strength is necessary to operate the indicating means therein and it has been found that accurate reading is not obtainable with such an arrangement because, when the circuit is closed by the contacting of the point of the piercing instrumentality with the metal as it pierces the coating, such circuit closing will cause a flow of current which is of such strength as to tend to burn the coating and metal at such piercing point.

An object of the present invention is to secure accurate reading through the elimination of this burning at the contact point due to the strength of the current flow at that point. A further object is to provide the micrometer gauge with a member having a surface for contacting the surface of the coating, which surface is so formed as to permit the rocking of the gauge upon the coating surface to cause the piercing point of the gauge to pierce the coating and bring the point into light accurate contact with the surface of the metal beneath the coating to close the circuit and cause a very minor flow of current for operating an amplifier, which in turn will amplify the current and operate an indicating device within the circuit. With this arrangement, by placing this fixed end of the micrometer gauge in contact with the coating and then rocking the gauge upon this end, and simultaneously adjusting the piercing point of the gauge, the indicator will be operated upon the slightest contact between the piercing point and the metal beneath the coating. An accurate reading of the thickness of the coating will therefore be indicated by the gauge, the rocking of the gauge causing the piercing point to pierce the coating gradually as the micrometer gauge is operated to adjust the piercing point longitudinally.

In the accompanying drawing, the present invention is shown as applied to an ordinary micrometer gauge, as illustrative of an embodiment of the present invention, and in Figure 1 of the drawing, such a gauge is shown in side elevation and provided with a head which is shown in cross section, the work or coated metal being also shown in section to illustrate the operation of the device;

Fig. 2 is a view taken at right angles to that of Fig. 1 and showing the rocking head in transverse section together with the coated metal or work which is also shown in section; and Fig. 3 is an enlarged sectional detail showing the manner in which the device is operated by rocking the micrometer and its piercing point, with the curved surface of the gauge head in contact with the surface of the coating.

In the drawing 1 indicates a micrometer gauge of the usual construction having a fixed stem 2 to the lower end of which a head indicated as a whole by the numeral 3 is rigidly secured in any suitable manner. The gauge is also provided with the usual stem 4 which is moved longitudinally in the usual manner by the turning of the thimble 5 and thus adjusting the needle point 6 of the stem 4 longitudinally and relative to the head 3, which head is formed with a lower surface 7 curved about a point within the axis of the stem 4, thus providing a curved surface to contact the surface of the coating 8 upon the metal sheet or work 9, so that the micrometer gauge and its head 3 may be rocked upon the surface of the coating; and, if the needle point 6 be adjusted so that this point lies within the plane of the curvature of the surface 7 of the head, the piercing point 6 will be held to just clear the surface of the coating 8 and the reading of the gauge should then indicate zero so that, upon adjustment of the stem 4 longitudinally, the piercing point will be projected beyond this curved surface of the head and will pierce the coating 8 as the head is rocked in contact with the coating. The distance which the piercing point projects beyond the curved surface of the head will be accurately indicated by the gauge and, when the point 6 pierces the non-conductive coating and comes into contact with the metal 9, that fact will be indicated by a suitable indicator within an electrical circuit within which circuit said piercing point and metal 9 are connected, and therefore a very accurate reading of the thickness of the coating will be secured.

In order to limit the amount of current flow when the point 6 contacts the metal 9, a thermionic tube amplifier 10 is connected within the circuit, a grid side of this amplifier 10 being connected within a grid circuit 11 one terminal of which is connected to the metal plate 9 of the work and the other terminal to the grid of the amplifier. The plate side of the amplifier is connected within a plate circuit 12 within which an indicating device, such as a galvanometer 14, is connected with one terminal of this plate circuit connected to the plus terminal of a battery or other source 13 of electrical energy and the other terminal to the plate of the amplifier. The film side of the amplifier 10 is connected within a circuit 15 with one terminal connected to the head 3 and the other terminal connected to the minus terminal of the battery 13.

Therefore, as indicated in Fig. 1, when the point 6 of the stem 4 of the micrometer gauge 1 pierces the coating 8 and comes into contact with the metal 9 even lightly, the grid circuit of the amplifier 10 will be closed and a flow of current will be induced in the plate circuit 12 of much greater amplitude and which current will be sufficient to operate the galvanometer 14 to give the indication that the point 6 has penetrated the coating 8, and by then reading the indication on the gauge, showing the degree of longitudinal adjustment of the point 6 from the zero point of such adjustment, the accurate measurement of the thickness of the coating will be given by such reading.

Preferably the head 3 as shown in Fig. 1 has its lower surface 7, for contacting the surface of the coating 8, curved throughout the length of the head about a point located within the longitudinal axis of the stem 4, and this head is also preferably formed with a lower contact surface which is curved transversely of the head about the same axis of curvature, as indicated in Fig. 2, and therefore the surface of the head which contacts the surface of the coating is curved semi-spherically and the head may therefore be rocked in any direction upon the surface of the coating 8 to move the piercing point 6 into and out of engagement with the coating. Therefore by this rocking movement, the piercing point is gradually forced into the coating, said point being at the same time gradualy adjusted longitudinally by the turning of the thimble 5 to advance the point as the head is rocked, and thus adjusting it so that it will finally pierce the coating and come into contact with the metal 9 without being forced into the metal but just lightly and accurately contacting the metal to close the electrical circuit and give the proper indication. This curving of the contact surface of the head also permits the placing of the head against a concave or convex surface of the work and the reading will be as accurate as when the head is placed against a plane surface of the work.

With the arrangement of the thermionic amplifier tube within the circuit, the indicator or galvanometer 14 will be operated by an induced current flow caused by a minute flow of current, and therefore, when the point 6 contacts the metal 9, the flow of current therethrough will be so slight that there will be no danger of burning the coating or metal at the piercing point, which burning would permit the point to enter the metal beyond its surface, and therefore accurate reading of the thickness of the coating is had. Obviously current amplifying means other than this tube amplifier may be employed, and the lower fixed end member of the gauge may be in the form of a head as shown, or any other form of rest may be provided to suit the work in hand and upon which the gauge may be rocked, and such changes may be made without departing from the spirit of the present invention and are contemplated.

Having thus fully described my invention what I claim is:

1. A gauge for measuring the thickness of a coating on a body comprising, a longitudinally movable member having a pointed end, a fixed end member on said movable member and adapted for resting upon the surface of the body coating to be measured, the surface of said fixed member in contact with said body coating being curved to permit rocking of said fixed member surface in point contact with said body coating surface, said curvature extending in the direction of rockability of said fixed member, and said pointed end of said longitudinally movable member being adjusted to protect beyond said curved surface and pierce said body coating.

2. A gauge for measuring the thickness of a coating on a body comprising, a longitudinally movable member having a pointed end, a fixed end member on said movable member and adapted for resting upon the surface of the body coating to be measured, the surface of said fixed member in contact with said body coating being curved about a point lying within the longitudinal axis of said longitudinally movable member to permit rocking of said fixed member surface on said body coating surface, said curvature extending in the direction of rockability of said fixed member, and said pointed end of said longitudinally movable member being adjusted longitudinally during said rocking to project beyond said curved surface and pierce said body coating.

3. A gauge for measuring the thickness of a coating on a body comprising, a longitudinally movable member having a pointed end, a fixed end member on said movable member and adapted for resting upon the surface of the body coating to be measured, the portion of said fixed member facing said body coating surface being formed with a pair of convex surfaces transversely related to each other and having a common center of curvature lying on the longitudinal axis of said longitudinally movable member, said convex surfaces permitting rockability of said fixed member on and in point contact with said body coating surface, and said pointed end of said longitudinally movable member being longitudinally adjustable during the rocking of said fixed member to project beyond said convex surfaces and pierce said body coating.

LAUNCELOT A. DANSE.